United States Patent [19]

Sato et al.

[11] Patent Number: 4,618,914
[45] Date of Patent: * Oct. 21, 1986

[54] ELECTRICAL INSULATING OIL AND OIL-FILLED ELECTRICAL APPLIANCES

[75] Inventors: Atsushi Sato, Tokyo; Keiji Endo, Yokosuka; Shigenobu Kawakami, Ichikawa; Hitoshi Yanagishita; Shozo Hayashi, both of Yokohama, all of Japan

[73] Assignee: Nippon Petrochemicals Company, Limited, Tokyo, Japan

[*] Notice: The portion of the term of this patent subsequent to Jan. 15, 2002 has been disclaimed.

[21] Appl. No.: 706,408

[22] Filed: Feb. 28, 1985

[30] Foreign Application Priority Data

Mar. 8, 1984 [JP] Japan .................. 59-44951

[51] Int. Cl.⁴ .................. H01G 4/22; H01B 3/22
[52] U.S. Cl. .................. 361/315; 174/17 LF; 174/25 C; 252/570; 361/323; 361/327; 585/6.3; 585/6.6; 585/25; 585/435; 585/436; 585/440
[58] Field of Search .................. 174/17 LF, 25 C; 252/570; 361/315, 323, 327; 585/6.3, 6.6, 25, 435, 436, 440

[56] References Cited

U.S. PATENT DOCUMENTS 2,578,207 12/1951 Pines et al. .................. 585/25
3,483,452 12/1969 Thigpen .................. 252/570
4,068,286 1/1978 Iijima et al. .................. 361/315
4,493,943 1/1985 Sato et al. .................. 585/6.6
4,506,107 3/1985 Sato et al. .................. 585/6.6

Primary Examiner—Paul Lieberman
Assistant Examiner—Robert A. Wax
Attorney, Agent, or Firm—Scully, Scott, Murphy & Presser

[57] ABSTRACT

An improved electrical insulating oil which is stable in refining treatment and good electrical properties are maintained under high temperature conditions, and oil-filled electrical appliances impregnated therewith. The electrical insulating oil comprises 1,1,-diarylalkenes which are represented by the following general formula (I):

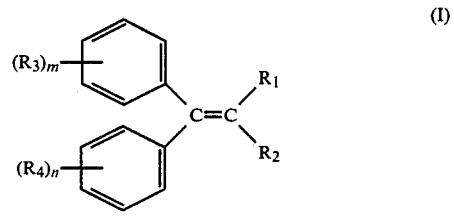

wherein $R_1$ to $R_4$'s are the same or different and each of them is a hydrogen atom or an alkyl group having 1 to 5 carbon atoms, and m and n are integers from 0 to 3, inclusive.

11 Claims, No Drawings

ELECTRICAL INSULATING OIL AND OIL-FILLED ELECTRICAL APPLIANCES

BACKGROUND OF THE INVENTION

(1) Field of the Invention

This invention relates to an electrical insulating oil and oil filled electrical appliances. More particularly, the invention relates to an electrical insulating oil which is stable in refining treatments and which can maintain its excellent electrical characteristics even under high temperature conditions, and oil filled electrical appliances that are impregnated with the same.

(2) Description of the Prior Art

Electrical appliances such as oil-filled capacitors, oil-filled power cables and transformers have recently been made to withstand high electric voltages while being made small in size. With this tendency, various kinds of plastic films are used together with or in place of conventional insulating paper.

In the conventional art, refined mineral oils, polybutenes, alkylbenzenes, polychlorinated biphenyls and the like are used as electrical insulating oils; however, they have several drawbacks. For example, the use of halogenated aromatic hydrocarbons such as polychlorinated biphenyls was discontinued because it constitutes a public health hazard. Furthermore, the conventional electrical insulating oils are not satisfactorily compatible with the plastic materials such as polyolefin which are recently used in oil-filled electrical appliances.

With the requirements of durability to high-voltage and size reduction, it is necessary that the electrical insulating oil has a high dielectric breakdown voltage and a good hydrogen gas absorbing capacity.

The hydrogen gas absorbing capacity indicates the stability of the insulating oil against corona discharge (partial discharge) under high electric voltage conditions. The higher the hydrogen gas absorbing capacity, the smaller the likelihood of corona discharge, which leads to the advantage of the insulating oil having excellent stability or durability.

Meanwhile, in order to meet the requirement of high-voltage use, plastic materials such as polyolefin, polyester and polyvinylidene fluoride are used to replace either partially or completely the conventional insulating paper as insulating materials or dielectric materials for electrical appliances such as oil-filled electric cables and capacitors. In view of their dielectric strength, dielectric loss tangent and dielectric constant, polyolefin films, especially polypropylene and polyethylene films, are preferred as the plastic films.

When these plastics, especially the polyolefins such as polypropylene, are impregnated with insulating oils, some oils cause the films to swell or dissolve to some extent. If a plastic material is swollen, the thickness of insulating layers increases and the resistance to the flow of insulating oil increases in electrical cables, and insufficient impregnation with insulating oil occurs in electric capacitors, causing the formation of voids (unimpregnated portions), the undesirable lowering of the corona discharge voltage and the increase of the volumes of capacitors, all of which are not desirable.

In connection with the above-mentioned conventional electrical insulating oils, the values of dielectric breakdown voltages (BDV) and dielectric loss tangents (tan δ) are satisfactory to a certain extent, but the hydrogen gas absorbing capacity or corona discharge characteristic and the stability of the dimensions of plastic films are not satisfactory.

As described above, the requirements in the use of electrical insulating oils in recent years have become so severe that even a trace quantity of impurity in an electrical insulating oil sometimes causes a problem. Accordingly, it is necessary to subject electrical insulating oils to refining before they are used for impregnation of electrical appliances.

For the refining of electrical insulating oils, solid refining agents in granular or powder form are generally employed because they are efficient and the separation of them after refining is easy. The solid refining agents are exemplified by clays such as activated clay and fuller's earth; silica, silica gel, alumina, alumina gel, synthetic silica-alumina and activated carbon. The refining is done by adsorbing small quantities of impurities in an electrical insulating oil with these refining agents. The refined electrical insulating oil is used preferably just after refining though the refined oil can be used after storage.

These solid refining agents, however, have the Bronsted acid point or Lewis acid point as well as the adsorbing property. For this reason, many refining agents catalyze in chemical reactions. Accordingly, some ingredients in electrical insulating oils are chemically modified by the catalytic action of these solid refining agents in refining process, and thus stable and satisfactory refining cannot be done.

Furthermore, even though the oil-filled electrical appliances such as oil-filled capacitors are generally used at room temperature, they are sometimes used at considerably high temperatures due to climatic or other conditions in use. In large-sized capacitors, as the heat of dielectric loss is accumulated inside the capacitors, the temperature in the inner parts of capacitors sometimes becomes considerably high. Therefore, the uses under high temperature conditions must be taken into consideration with respect to oil-filled capacitors.

The interaction between electrical insulating oils and plastic materials at high temperatures are, however, different from the interaction at ordinary temperatures. The oil-filled capacitors impregnated with the above recently proposed electrical insulating oils are not always satisfactory at high temperatures, which is different from the uses at room temperature.

In U.S. Pat. No. 4,347,169 is disclosed an electrical insulating oil comprising diarylalkanes and unsaturated dimers or codimers of styrenes such as styrene and α-methylstyrene and oil-filled electrical appliances impregnated with the same. This electrical insulating oil is desirable because the compatibility with plastics is good, however, it has a defect that one of their component material such as unsaturated dimer of α-methylstyrene is liable to be deteriorated by solid refining agents. In addition, the oil-filled capacitors impregnated with such an electrical insulating oil cannot always exhibit their satisfactory performances under the use conditions at high temperatures such as 80° C.

BRIEF SUMMARY OF THE INVENTION

In view of the above-described conventional state of the art, it is the primary object of the present invention to provide an improved electrical insulating oil which is stable in the treatment with solid refining agents and, as a result, which can be refined satisfactorily.

Another object of the present invention is to provide an electrical insulating oil which is good in the compatibility with plastics that are used as dielectric or insulating materials and which is excellent in electrical characteristics such as corona discharge characteristics, to facilitate the production of small-sized and long-life electrical appliances.

A further object of the present invention is to provide an electrical insulating oil which can exhibit its full performances even under high temperature conditions.

Still a further object of the present invention is to provide an electrical insulating oil having the foregoing characteristic advantages and electrical appliances which are impregnated with the same.

According to the present invention, the electrical insulating oil and the insulating oil for use in impregnating electrical appliances of the invention comprises 1,1-diarylalkenes which are represented by the following general formula (I):

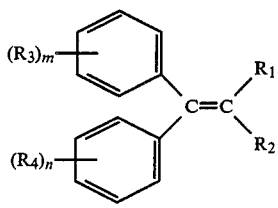

(I)

wherein $R_1$ to $R_4$'s are the same or different and each of them is a hydrogen atom or an alkyl group having 1 to 5 carbon atoms, and m and n are integers from 0 to 3, inclusive.

In the refining process with a solid refining agent, the conversion rate of the above 1,1-diarylalkenes is very low and they are scarcely caused to change. For example, the conversion rate is 10% at the utmost in refining at 25° C. for 30 minutes with 1% by weight of activated clay. Furthermore, the 1,1-diarylalkenes has good impregnating property and compatibility relative to plastics. Still further, electrical appliances that are impregnated with the 1,1-diarylalkenes exhibit satisfactory performances also under high temperature conditions.

DETAILED DESCRIPTION OF THE INVENTION

The 1,1-diarylalkenes are exemplified by the compounds of 1-methylphenyl-1-(ethylphenyl)ethylene, 1-methylphenyl-1-(dimethylphenyl)ethylene, 1-ethylphenyl-1-(dimethylphenyl)ethylene, 1,1-diphenylbutene-1, 2-methyl-1,1-diphenylpropene-1, 1,1-diphenylpentene-1 and 2-methyl-1,1-diphenylbutene-1.

The above 1,1-diarylalkenes can be employed singly or in combination of two or more kinds.

In view of the impregnating property to electrical appliances, the viscosity of the electrical insulating oil of the present invention is not higher than 30 cSt ($3 \times 10^{-5}$ m$^2$/sec), and preferably lower than 20 cSt ($2 \times 10^{-5}$ m$^2$/sec) at 40° C.

Among the above-defined 1,1-diarylalkenes, 1,1-diarylethylenes represented by the following general formula (II) are desirable:

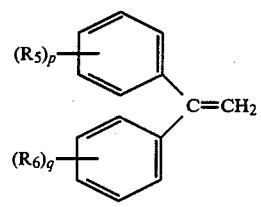

(II)

wherein $R_5$'s and $R_6$'s are the same or different and each of them is a hydrogen atom or an alkyl group, p and q are integers from 0 to 3, inclusive, and the total number of carbon atoms in both the $R_5$'s of p in number and $R_6$'s of q in number is 0 to 5, inclusive. If the above total number of carbon atoms is 6 or more, the viscosity of 1,1-diarylethylene is too high to cause insufficient impregnation and the stability to corona discharge is lowered owing to the lowering of aromatic character of the compounds.

The above 1,1-diarylethylenes can also be employed singly or in combination of two or more kinds.

The 1,1-diarylethylenes are exemplified by the following compounds:
1,1-diphenylethylene,
1-phenyl-1-(methylphenyl)ethylene,
1-phenyl-1-(ethylphenyl)ethylene,
1-phenyl-1-(n-propylphenyl)ethylene,
1-phenyl-1-(isopropylphenyl)ethylene,
1-phenyl-1-(methylethylphenyl)ethylene,
1-phenyl-1-(n-butylphenyl)ethylene,
1-phenyl-1-(sec-butylphenyl)ethylene,
1-phenyl-1-(isobutylphenyl)ethylene,
1-phenyl-1-(tert-butylphenyl)ethylene,
1-phenyl-1-(amylphenyl)ethylene,
1-phenyl-1-(tert-amylphenyl)ethylene,
1-phenyl-1-(dimethylphenyl)ethylene,
1-phenyl-1-(trimethylphenyl)ethylene,
1,1-di(methylphenyl)ethylene,
1-methylphenyl-1-(dimethylphenyl)ethylene,
1-methylphenyl-1-(ethylphenyl)ethylene,
1-methylphenyl-1-(n-propylphenyl)ethylene,
1-methylphenyl-1-(isopropylphenyl)ethylene,
1-methylphenyl-1-(n-butylphenyl)ethylene,
1-methylphenyl-1-(isobutylphenyl)ethylene,
1-methylphenyl-1-(sec-butylphenyl)ethylene,
1-methylphenyl-1-(tert-butylphenyl)ethylene,
1-ethylphenyl-1-(dimethylphenyl)ethylene,
1-ethylphenyl-1-(n-propylphenyl)ethylene,
1-ethylphenyl-1-(isopropylphenyl)ethylene,
1,1-di(dimethylphenyl)ethylene,
1-dimethylphenyl-1-(n-propylphenyl)ethylene, and
1-dimethylphenyl-1-(isopropylphenyl)ethylene.

The 1,1-diarylalkenes of the present invention can be prepared by, for example, acylating alkylbenzene with benzoyl chloride or alkylbenzoyl chloride to obtain alkyl-benzophenone, reacting the alkylbenzophenone with a Grignard reagent such as methylmagnesium iodide to obtain diarylmethyl carbinol, and then dehydrating the diarylmethyl carbinol.

In another method, 1,1-diarylethylene can be prepared by dehydrogenating 1,1-diarylethane with a dehydrogenation catalyst such as iron catalyst. In this case, the alkyl groups of the starting 1,1-diarylethane are preferably those which are hardly dehydrogenated such as methyl group and tert-butyl group. Through such dehydrogenation, for example, 1-phenyl-1-(methylphenyl)ethylene can be prepared from 1-phenyl-1-(methylphenyl)ethane.

For the electrical appliances according to the present invention, other conventional electrical insulating oils can be mixed into the 1,1-diarylalkenes as far as general electrical properties of the latters are not impaired. Such electrical insulating oils to be mixed are exemplified by diarylalkanes such as phenyl-tolylmethane, phenylethylphenylmethane, 1-phenyl-1-tolylethane, 1-phenyl-1-xylylethane and 1-phenyl-2-(isopropylphenyl)ethane, alkylbiphenyls such as monoisopropylbiphenyl, alkylnaphthalenes such as diisopropylnaphthalene, diaryl ethers such as ditolyl ether, and diaralkyl ethers such as di($\alpha$-methylbenzyl)ether, as well as refined mineral oil, olefin oligomers such as polybutene, alkylbenzenes such as dodecylbenzene, phthalic esters such as dioctylphthalate, and animal and vegetable oils such as castor oil.

Furthermore, known antioxidants for use in electrical insulating oils can be added to the insulating oil of the present invention. For example, there are phenol compounds such as 2,6-di-tert-butyl-p-cresol (trademark: BHT), 2,2'-methylenebis(4-methyl-6-tert-butylphenol), 4,4'-butylidenebis(3-methyl-6-tert-butylphenol), 4,4'-thiobis(3-methyl-6-tert-butylphenol), stearyl-$\beta$-3,5-di-tert-butyl-4-hydroxyphenol)propionate (trademark: Irganox 1076), tetrakis[methylene-3(3',5'-ditert-butyl-4'-hydroxyphenyl)-propionate]methane (trademark: Irganox 1010), 1,3,5-trimethyl-2,4,6-tris(3,5-di-tert-butyl-4-hydroxybenzyl)benzene (trademark: Irganox 330), and 1,1,3-tris(2-methyl-4-hydroxy-5-tert-butylphenol)-butane (trademark: Topanol CA); sulfur compounds such as dilauryl thiodipropionate, distearyl thiodipropionate, laurylstearyl thiodipropionate, and dimyristyl thiodipropionate; and phosphorous compounds such as triisodecyl phosphite, diphenylisodecyl phosphite, triphenyl phosphite, and trinonylphenyl phosphite. The antioxidants can be added to the electrical insulating oil singly or in combination of two or more kinds. The addition quantity of the antioxidant is 0.001 to 5% by weight and preferably 0.01 to 2.0% by weight of the electrical insulating oil.

Furthermore, in order to impart a nonflammable property and other desirable properties to the electrical insulating oil of the present invention, several known additives such as phosphoric esters and epoxy compounds may be added to the electrical insulating oil.

The 1,1-diarylalkenes according to the present invention are quite suitable for use in impregnating oil-filled electrical appliances such as oil-filled capacitors, oil-filled cables and transformers. Especially, when oil-filled electrical appliances having dielectric materials or electrical insulating materials that are made partially or totally of plastics, are impregnated with the electrical insulating oil of the present invention, the electrical appliances have excellent corona discharge characteristic because the hydrogen absorbing capacity of the electrical insulating oil of the invention is high due to its aromatic olefinic feature. In addition, the electrical insulating oil is advantageous in that the tendency to swell plastics is small, wherein preferable plastics are polyolefins, especially polypropylene.

In the above-described capacitors, an electrode of a metallic conductor made of a metal foil such as aluminum foil and a dielectric material made of a plastic film or a laminate of a plastic film and paper are superposed and wound together to form a capacitor element. The plastic films used for this purpose are polyolefin films such as polypropylene, polyethylene and polymethylpentene films; polyester film and polyvinylidene fluoride film. Among them, the polyolefin films, especially polypropylene film, are preferable because the compatibility with 1,1-diarylalkenes is quite good even though they are not expensive. The electrical insulating oil of the present invention can also be used for capacitors in which metallized paper or metallized plastic films are wound. The metallized paper or the metallized film can be made by applying a metallic layer of aluminum, zinc or else as an electrode layer by vacuum evaporation coating. The thus formed capacitor elements can be impregnated with the electrical insulating oil of the present invention in accordance with the conventional method.

In some oil-filled cables, insulation tapes are wound around electric conductors that are made of copper or aluminum. The insulation tapes used for this purpose are made of insulating paper, polyolefins such as polypropylene, polyethylene and polymethylpentene; polyester, polyvinylidene fluoride, composite materials that are made by laminating insulating paper with polyolefins such as polypropylene by melt-extrusion, and the lamination of insulating paper and silane-grafted polyolefin. Among them, preferable tapes are those in which polyolefin such as polypropylene is used at least partially. The thus produced cable elements can be impregnated with the electrical insulating oil of the present invention in accordance with the conventional method to obtain oil-filled cables.

In the following, the present invention will be described in more detail with reference to several examples.

EXAMPLE 1

An activated clay (trademark: Galleonite #236, made by Mizusawa Industrial Chemicals Co., Ltd.) having the following properties was dried at 130° C. for 15 hours. This activated clay is commercially available as an agent for refining electrical insulating oils. Five grams of this activated clay was added respectively to each 500 g of three kinds of aromatic olefins, 1,1-diphenylethylene, 1-phenyl-1-(4-methylphenyl)ethylene and 1-phenyl-1-(3,4-dimethylphenyl)ethylene.

Refining was carried out by stirring them at room temperature (25° C.) for 30 minutes. After that, the changes in compositions caused to occur during the treatment were determined by gas chromatography and gel permeation chromatography, however, neither change in composition nor generation of polymer was observed in any compound. Accordingly, it was understood that the aromatic olefins were scarcely converted in this treatment.

| Properties of Activated Clay | |
|---|---|
| Specific surface area (m$^2$/g) | 260–300 |
| Surface acidity (m.mol/g) | |
| pKa +1.5 | 0.47–0.53 |
| pKa +1.5–pKa +3.3 | 0.06–0.07 |
| pKa +3.3–pKa +4.8 | 0.64–0.72 |
| pH of 5% suspension | 2.5–3.5 |
| Chemical composition (% by weight) | |
| SiO$_2$ | 70–85 |
| Al$_2$O$_3$ | 5–14 |
| Others (Fe$_2$O$_3$, MgO, CaO, etc.) | 25– 1 |

After the refining, electrical characteristics of these aromatic olefins were determined, the results of which are shown in the following Table 1.

Tests on Oil-Filled Capacitors

A two-ply polypropylene film (thickness of each layer: 14 microns) as a dielectric material and aluminum foil as an electrode were wound together according to the conventional method to obtain model capacitor elements for oil impregnation.

Ten of these model capacitor elements were impregnated with each of the foregoing refined aromatic olefins in vacuum according to the conventional method to prepare oil-filled capacitors. Electrostatic capacitances of these capacitors were about 0.4 μF. When the refined aromatic olefins were used for impregnation, 0.2% by weight of 2,6-di-tert-butyl-p-cresol as an antioxidant was added to the aromatic olefins.

An electric voltage of 2800 V was applied to the above obtained oil-filled capacitors at room temperature so as to determine their life span. However, any of capacitors were not broken down during the voltage aplication for 500 hours.

COMPARATIVE EXAMPLE 1

2,4-Diphenyl-4-methylpentene-1 (unsaturated linear dimer of α-methylstyrene) was subjected to treatment with the activated clay in the like manner as Example 1. In this treatment, cyclic saturated compounds and polymers were produced and the conversion rate of the olefin was 95%.

Furthermore, similar treatment was applied to 1-phenyl-1-(4-vinylphenyl)ethane, in which the greater part of this olefin was converted into polymers.

That is, when the above two kinds of aromatic olefins were refined using clay in the like manner as Example 1 by the conventional method, the viscosities of them became high, impregnating property was lowered, and olefin contents were extremely lowered. Thus, the effect as electrical insulating oils of these aromatic olefins could not be produced.

EXAMPLE 2 AND COMPARATIVE EXAMPLE 2

In Example 2, 1-phenyl-1-(4-methylphenyl)ethylene (Insulating Oil 1) and 1-phenyl-1-(3,4-dimethylphenyl)ethylene (Insulating Oil 2) were used. In Comparative Example 2, 1-phenyl-1-xylylethane (Insulating Oil 3), benzyltoluene (Insulating Oil 4) and monoisopropyl biphenyl (Insulating Oil 5) were used. They were refined with clay treatment according to the refining process in Example 1.

The properties of these obtained insulating oils are shown in the following Table 1. By the way, 0.2% by weight of BHT as an antioxidant was added to the above insulating oils before use.

Then, a two-ply polypropylene film (thickness of each layer: 14 microns) as a dielectric material and aluminum foil as an electrode were wound together according to the conventional method to obtain model capacitor elements for oil impregnation.

These model capacitor elements were impregnated with each of the foregoing insulating oils in vacuum according to the conventional method to prepare oil-filled capacitors of about 0.4 μF in electrostatic capacitance.

Electric voltages were applied to the above obtained oil-filled capacitors at 80° C. and corona starting voltages (CSV) and corona ending voltages (CEV) were determined.

Meanwhile, other oil-filled capacitors prepared likewise were applied with a constant alternating voltage at 80° C. until the capacitors were broken to determine the life span of capacitors. Each value of breakdown time was calculated such that 14 capacitors impregnated with one insulating oil were tested and two maximum values and two minimum values were neglected and the average of the other 10 breakdown times was adopted as a resultant value. The breakdown times are indicated by relative values on the base value 1.0 of Insulating Oil 3. The results are also shown in Table 2.

From the results on Table 2, it will be understood that the oil-filled capacitors according to the present invention have very long life at high temperatures as compared with the capacitors impregnated with the phenylxylylethane or else. Furthermore, the oil-filled capacitors of the present invention were, of course, useful at room temperature.

TABLE 1

| | Insulating Oil | | | | | |
| --- | --- | --- | --- | --- | --- | --- |
| | | 1-phenyl-1-(4-methylphenyl)-ethylene | 1-phenyl-1-(3,4-dimethylphenyl)-ethylene | Comparative Example 2 | | |
| Test | 1,1-diphenyl-ethylene | (Ex. 2, Oil 1) | (Ex. 2, Oil 2) | Oil 3 | Oil 4 | Oil 5 |
| Kinematic Viscosity (cSt, @ 40° C.) | 3.73 | 4.44 | 8.64 | 5.06 | 2.53 | 4.48 |
| Specific Gravity | 1.026 | 1.009 | 1.009 | 0.990 | 0.999 | 0.990 |
| Acid Value (mg, KOH/g) | 0.00 | 0.00 | 0.00 | 0.00 | 0.00 | 0.00 |
| Dielectric Breakdown Voltage (kV/2.5 mm) | 70 or above | 70 or above | 70 or above | 70 or above | 70 or above | 70 or above |
| Dielectric Loss (%, @ 80° C.) | 0.001 | 0.001 | 0.001 | 0.001 | 0.001 | 0.001 |
| Specific Volume Resistivity (Ω · cm, @ 80° C.) | $4.2 \times 10^{15}$ | $3.3 \times 10^{15}$ | $5.0 \times 10^{15}$ | $5.0 \times 10^{15}$ | $1.5 \times 10^{15}$ | $2.1 \times 10^{15}$ |
| Dielectric Constant | 2.54 | 2.61 | 2.71 | 2.49 | 2.50 | 2.52 |

TABLE 2

| Test | Insul. Oil Example 2 | | Comparative Example 2 | | |
| --- | --- | --- | --- | --- | --- |
| | 1 | 2 | 3 | 4 | 5 |
| CSV (kV, @80° C.) | 4.0 | 4.0 | 3.6 | 3.7 | 3.6 |
| CEV (kV, @80° C.) | 3.1 | 3.0 | 2.8 | 2.9 | 2.8 |
| Breakdown Time (@80° C.) | 42.5 | 37.2 | 1.0 | 0.2 | 0.9 |

What is claimed is:

1. An electrical insulating oil comprising at least one member of 1,1-diarylethylenes which are represented by the following formula (II):

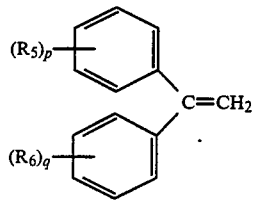

(II)

wherein $R_5$'s and $R_6$'s are the same or different and each of them is a hydrogen atom or an alkyl group having 1 to 5 carbon atoms, p and q are integers from 0 to 3, inclusive, and the total number of carbon atoms in both the $R_5$'s of p in number and $R_6$'s of q in number is 0 to 5, inclusive.

2. The electrical insulating oil in claim 1, wherein said 1,1-diarylethylenes are at least one member selected from the group consisting of 1,1-diphenylethylene, 1-phenyl-1-(methylphenyl)ethylene and 1-phenyl-1-(dimethylphenyl)ethylene.

3. An electrical insulating oil composition comprising, as the sole insulating oil components thereof, at least one member of 1,1-diaryethylenes which are represented by the following formula (II):

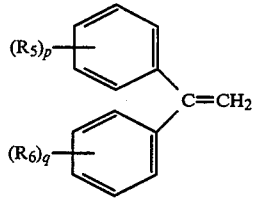

(II)

wherein $R_5$'s and $R_6$'s are the same or different and each of them is a hydrogen atom or an alkyl group, p and q are integers from 0 to 3, inclusive, and the total number of carbon atoms in both the $R_5$'s of p in number and $R_6$'s of q in number is 0 to 5, inclusive, and at least one other additive for electrical insulating oil compositions selected from the group consisting of anitoxidants and flame retardants.

4. Electrical appliances impregnated with an electrical insulating oil comprising at least one of 1,1-diarylalkenes which are represented by the following general formula (I):

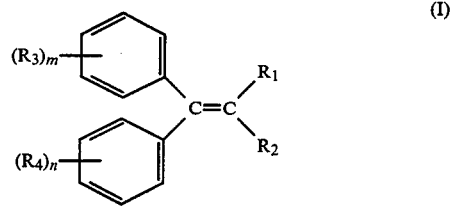

(I)

wherein $R_1$ to $R_4$'s are the same or different and each of them is a hydrogen atom or an alkyl group having 1 to 5 carbon atoms, and m and n are integers from 0 to 3, inclusive.

5. The electrical appliances in claim 4, wherein said 1,1-diarylakenes are 1,1-diarylethylenes represented by the following general formula (II):

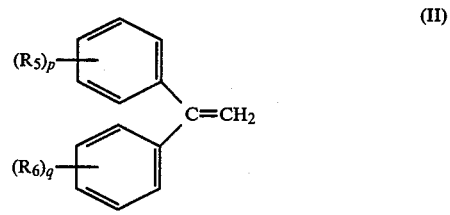

(II)

wherein $R_5$'s and $R_6$'s are the same or different and each of them is a hydrogen atom or an alkyl group having 1 to 5 carbon atoms, p and q are integers from 0 to 3, inclusive, and the total number of carbon atoms in both the $R_5$'s of p in number and $R_6$'s of q in number is 0 to 5, inclusive.

6. The electrical appliances in claim 5, wherein said 1,1-diarylethylenes are at least one member selected from the group consisting of 1,1-diphenylethylene, 1-phenyl-1-(methylphenyl)ethylene and 1-phenyl-1-(dimethyl-phenyl)ethylene.

7. The electrical appliances in claim 4, wherein at least one part of the dielectric material or insulating material of said electrical appliance comprises a plastic material.

8. The electrical appliances in claim 7, wherein said plastic material is polyolefin.

9. The electrical appliances in claim 8, wherein said polyolefin is polypropylene.

10. The electrical appliances in claim 4, wherein said oil-filled electrical appliances are oil-filled capacitors.

11. The electrical appliances in claim 10, wherein said oil-filled capacitors are those produced by using capacitor elements in which at least one sheet of plastic film is wound together with a metal conductor.

* * * * *